United States Patent

Brown

[11] Patent Number: 5,193,264
[45] Date of Patent: Mar. 16, 1993

[54] IN SITU FOAM MOLDING PROCESS AND ARTICLES

[75] Inventor: Paul E. Brown, Midland, Mich.

[73] Assignee: Steelcase Inc., Grand Rapids, Mich.

[21] Appl. No.: 153,355

[22] Filed: Feb. 8, 1988

[51] Int. Cl.⁵ .............................................. B29C 67/22
[52] U.S. Cl. .................................. 29/458; 264/46.5; 264/46.6; 264/154
[58] Field of Search ............... 264/46.4, 46.5, 46.6, 264/154; 156/79; 29/434, 458

[56] References Cited

U.S. PATENT DOCUMENTS

| | | | |
|---|---|---|---|
| 3,435,470 | 4/1969 | Krenzler | 156/79 |
| 3,442,411 | 6/1969 | Mahoney | 215/40 |
| 3,557,030 | 1/1971 | Simons | 264/46.6 |
| 3,564,602 | 2/1971 | Peck | 264/46.6 |
| 3,594,836 | 7/1971 | Robertson | 264/46.5 |
| 3,799,380 | 3/1974 | Hashimoto et al. | 215/40 |
| 3,984,510 | 10/1976 | Chandra et al. | 10/76 |
| 4,073,841 | 2/1978 | Dultgen et al. | 2/78 |
| 4,134,942 | 1/1979 | Mirr et al. | 264/46.6 |
| 4,161,090 | 7/1979 | Watts, Jr. | 7/79 |
| 4,245,931 | 1/1981 | Watts, Jr. | 264/46.6 |
| 4,260,575 | 4/1981 | Thew et al. | 264/154 |
| 4,269,890 | 5/1981 | Breitling et al. | 428/320 |
| 4,274,822 | 6/1981 | Tamai et al. | 264/46.6 |
| 4,338,270 | 7/1982 | Uffindell | 264/46 |
| 4,426,348 | 1/1984 | Salisbury | 264/53 |
| 4,481,160 | 11/1984 | Bree | 264/135 |
| 4,562,032 | 12/1985 | Gaudreau | 264/46.6 |
| 4,565,511 | 1/1986 | Ramisch | 425/146 |
| 4,806,094 | 2/1989 | Rhodes, Jr. et al. | 264/46.6 |

OTHER PUBLICATIONS

Photographs—FIG. 1-5 illustrating a cap seal for dispensing containers and the like.

Primary Examiner—Allan R. Kuhns
Attorney, Agent, or Firm—Price, Heneveld, Cooper, DeWitt & Litton

[57] ABSTRACT

A method is provided for forming in situ a seal for dispensing containers and the like of the type having a body with a reservoir, a dispenser with an applicator surface, and a cap detachably connected with the body, and selectively covering the dispenser applicator surface. The in situ method comprises providing a mandrel shaped geometrically similar to either the cap or the dispenser. The selected one of the cap and the dispenser is then assembled on the mandrel to form a closed cavity therebetween into which is injected a foamable liquid of the kind which expands when cured into a substantially closed cell construction. The liquid foam is cured in the cavity to the extent that the liquid foam expands to completely fill the cavity, and solidifies to create a seal formed in situ on the one of the cap and the dispenser. In use, the cured foam seal is disposed between the applicator surface of the dispenser and the cap, and prevents the product from inadvertently leaking from the reservoir.

23 Claims, 3 Drawing Sheets

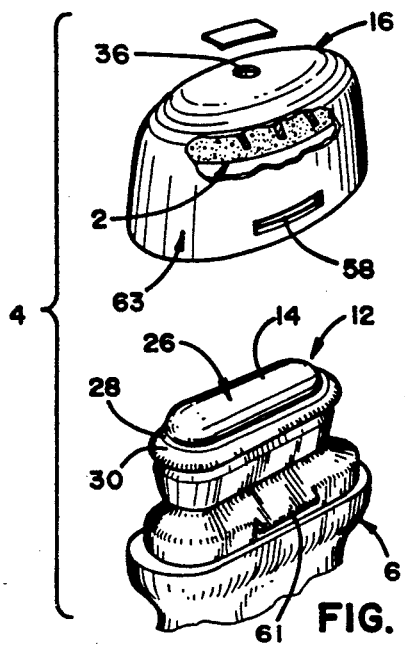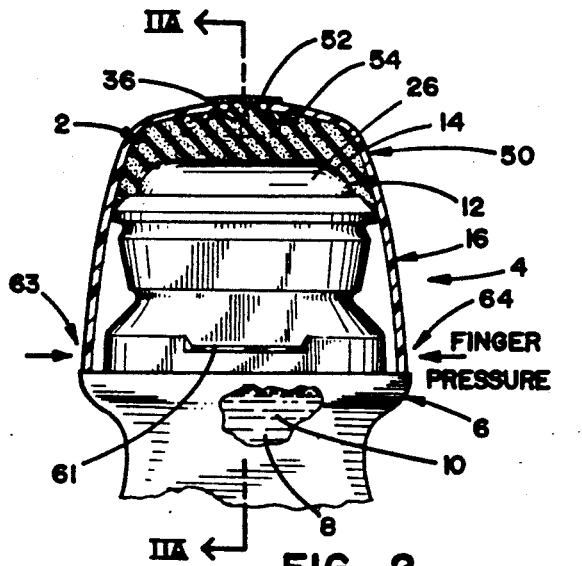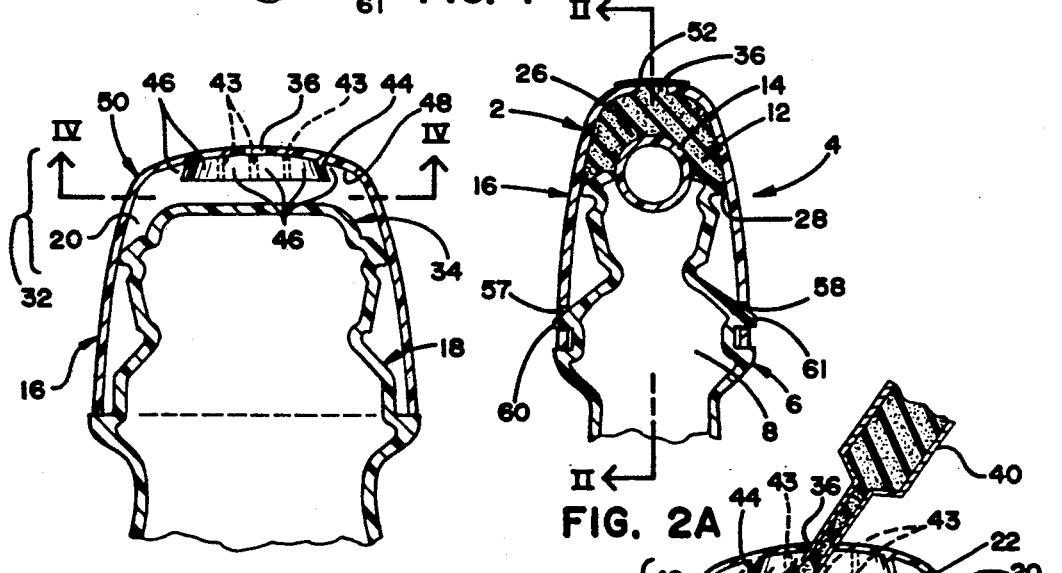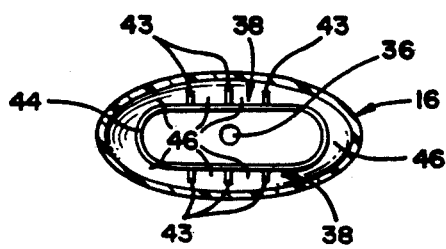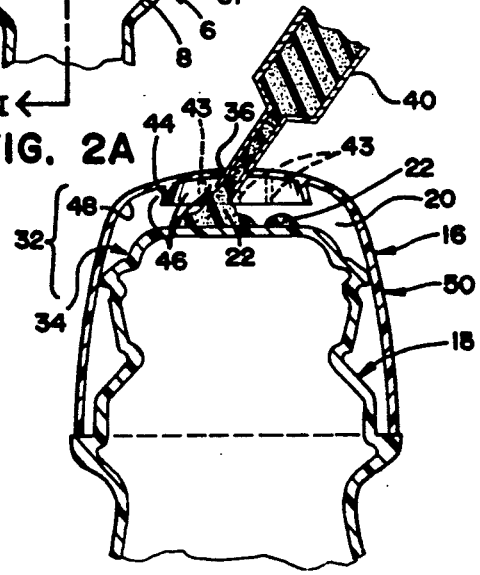

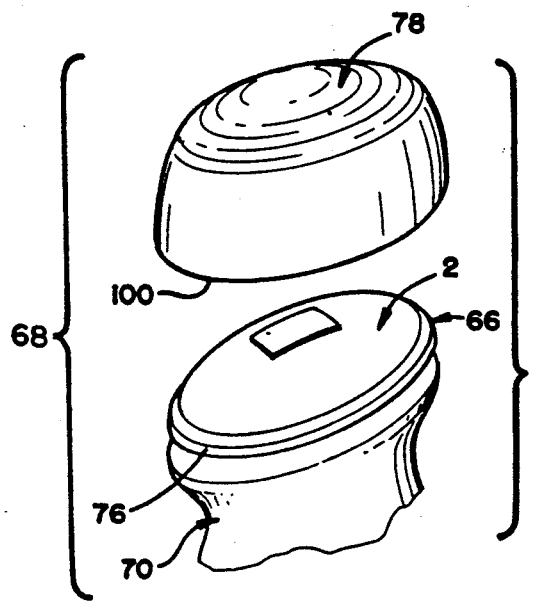
FIG. 8
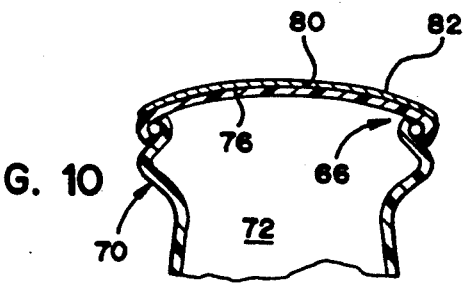
FIG. 9
FIG. 10
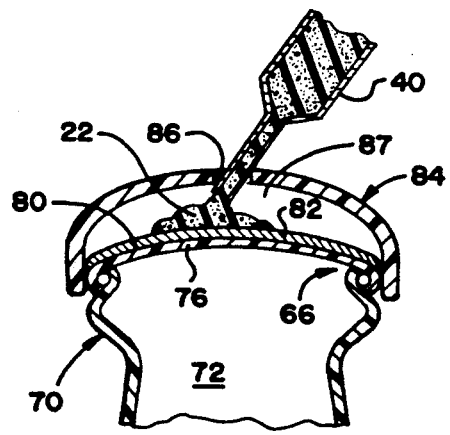
FIG. 11
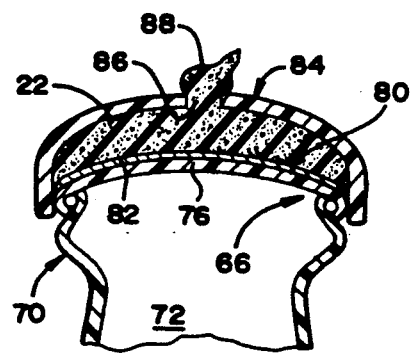
FIG. 12
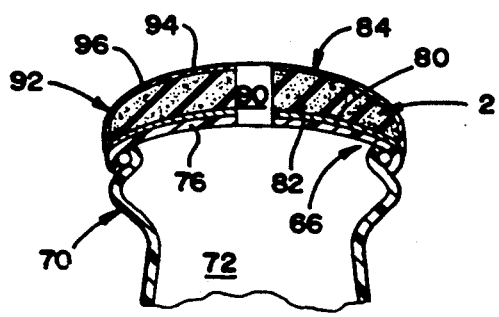
FIG. 13
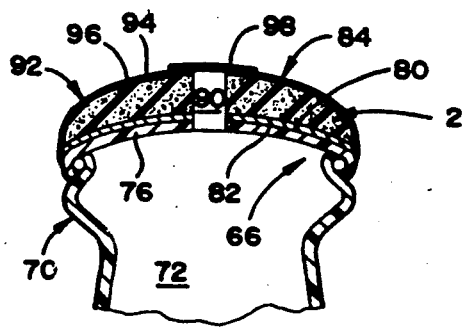
FIG. 14

IN SITU FOAM MOLDING PROCESS AND ARTICLES

BACKGROUND OF THE INVENTION

The present invention relates to molding foam materials, and in particular to a method of forming in situ a seal for dispensing containers, and the like.

Dispensing containers are used extensively to dispense a wide variety of different commercial and consumer products. Such products are normally in either a liquid or a powdered state, and include shoe polishes, perfumes, soaps, glues, baby powders and the like. The container typically includes a reservoir to retain the liquid or powdered product, and a dispenser to selectively flow product from the reservoir. The dispensing container may also have a removable cap to cover the dispenser.

Such dispensing containers are used widely for deodorants and/or antiperspirant of both the liquid and powdered types. These deodorant dispensers normally have a ball or a roller rotatably mounted in the container, wherein the exterior surface of the ball or roller acts as an applicator that picks up deodorant from the container reservoir and presents the same on the ball or roller for application to the skin of the user. Dispensers for some powdered deodorants have a fixed applicator, with metering apertures through which the deodorant flows from the reservoir.

In both of the above-noted designs, conventional deodorant dispensers also have a removable cap, which covers the dispenser during nonuse to prevent the applicator surface from being inadvertently exposed to clothing, or other objects which could be stained, or otherwise damaged by the deodorant. There is a tendency for the liquid to leak across the applicator surface during periods when the dispensing container is not being used. Inevitably people travel with dispensing containers filled with either liquid or powdered product. When these containers are packed among clothes, leakage across the dispensing surface and through the cap can stain the clothes, leading to inconvenience as well as potential damage to the clothes. Even when the dispensing container is packed in a compact toilette case, leakage of product is undesirable.

In some prior deodorant dispensers, a preformed, separate elastomeric gasket is secured in an upper portion of the cap to provide a seal so that upon detachably connecting the cap to the container body, the applicator surface is selectively covered to provide a seal. An example of such a preformed, separate gasket arrangement is disclosed in the appended DISCLOSURE STATEMENT. However, in these arrangements, the elastomeric gasket is neither particularly convenient to manufacture nor install. To manufacture this type of gasket, expensive molding equipment is required. Moreover, installation of the individual, preformed gaskets into the caps requires extensive handling and labor. For example, the preformed gaskets must be individually fitted into the upper portion of the cap, and secured therein accordingly. If the gasket is not molded exactly to specification, or properly secured in the cap, a sufficient seal may not be provided.

Also, since such gaskets are preformed there is no assurance that they can be fitted into caps including structural irregularities. Any irregularity in the cap could change the position of the fitted gasket in the cap upper portion, thus preventing either a proper seal and/or attachment of the cap over the dispenser. Adhesives can be used to mount preformed gaskets in their associated cap. However, such adhesives are not particularly effective in securely bonding the two different materials in the cap and preformed seal, and/or create residues which can contaminate or adulterate the antiperspirant material.

Consequently, there is a demand for a seal that can be positioned in the cap with little or no handling, and be securely retained in place. The gasket should include a surface conforming closely to that of the applicator surface, and be situated in the cap upper portion such that when the cap is detachably connected to the dispenser a tight seal over the applicator surface is provided. At the same time the method used to form the seal should alleviate much of the cost associated with molding and handling of the elastomeric gasket.

SUMMARY

A method is provided for forming in situ a seal for dispensing containers and the like of the type having a body with a reservoir, a dispenser with an applicator surface, and a cap detachably connected with the body, and selectively covering the dispenser applicator surface. The in situ method comprises providing one of the cap and the dispenser, as well as a mandrel shaped geometrically similar to the other of the cap and the dispenser. The one of the cap and the dispenser is then assembled on the mandrel to form a closed cavity therebetween into which is injected a foamable liquid of the kind which expands when cured into a substantially closed cell construction. The liquid foam is cured in the cavity to the extent that the liquid foam expands to completely fill the cavity, and solidifies to create a seal formed in situ on the one of the cap and the dispenser. In use, the cured foam seal is disposed between the applicator surface of the dispenser and the cap, and prevents the product from inadvertently leaking from the reservoir.

The principal objects of the present invention are to provide a functional and convenient method for forming in situ a seal for dispensing containers and the like. Use of in situ molding to form the seal within a closed cavity allows for a minimum amount of handling thus reducing labor and cost. By forming the seal in situ on one of a cap and a dispenser it is insured that the foam seal will be particularly suited for its intended use. More specifically, the seal will provide a tight fit on one of the cap and the dispenser without undue concern as to fitting or handling of the seal itself, and without requiring excessive sealing force. The method promotes efficient use of materials since only a relatively small preselected amount of liquid foam need be injected into a closed cavity before the liquid foam has completely expanded to fill the closed cavity. When the seal is formed in one of the cap and the dispenser, the liquid foam can be conveniently injected through a cap or mandrel aperture, and when a stream of foam extrudes through the cap or mandrel aperture, a visual indication that the cavity has been filled is provided.

The cap preferably includes reinforcing ribs that form negative draft spaces into which the liquid foam expands to provide a secure mechanical interconnection between the foam seal and the cap. When the seal is formed on a dispenser, and a skin is applied to an exterior portion of the seal, application of a product via the seal exterior portion is facilitated. The foam seal has an uncomplicated, yet durable construction. It is economical to manufacture and install since the foam seal is secured to its intended area of application during the in situ molding process.

These and other features, advantages and objects of the present invention will be further understood and appreciated by those skilled in the art by reference to the following written specification, claims and appended drawings.

BRIEF DESCRIPTION OF THE DRAWINGS

FIG. 1 is an exploded perspective view of a dispensing container with a cap including a seal formed in situ by an associated method embodying the present invention;

FIG. 2 is a vertical cross-sectional view of the dispensing container and the cap including the seal taken along plane II—II of FIG. 2A;

FIG. 2A is a vertical cross-sectional view of the dispensing container and the cap including the seal taken along plane IIA—IIA of FIG. 2;

FIG. 3 is a vertical cross-sectional view of the cap detachably connected to a male mold member illustrating an assembly step of the method;

FIG. 4 is a view of the cap including an aperture and reinforcing ribs which form negative draft spaces taken along plane IV—IV of FIG. 3;

FIG. 5 is a vertical cross-sectional view of the cap detachably connected to the male mold member illustrating an injection step of the method;

FIG. 8 is an exploded perspective view of another embodiment of the present invention wherein the seal is formed in situ on a dispenser.

FIG. 9 is a vertical cross-sectional view of the dispenser of FIG. 8, including a skin-covered seal formed in situ on the dispenser covered by a cap;

FIG. 10 is a vertical cross-sectional view of the dispenser of FIG. 8, coated with an adherent substance illustrating a step of the method in which an exterior surface of the dispenser is prepared;

FIG. 11 is a vertical cross-sectional view of the coated applicator surface of FIG. 10, covered by a female mold member, and illustrating an assembling step and an injection step of the method;

FIG. 12 is a vertical cross-sectional view of a foam filled cavity in the dispenser of FIG. 8, illustrating a curing step of the method during which a stream of foam is extruded through a female mold member aperture;

FIG. 13 is a vertical cross-sectional view of the formed seal of FIG. 12, illustrating a finishing step of the method during which a skin is applied to an exterior surface of the seal and a dispensing aperture is formed to communicate the seal exterior surface and a reservoir; and FIG. 14 is a vertical cross-sectional view of the formed skin-covered seal of FIG. 13 with a patch over the applicator aperture.

DETAILED DESCRIPTION OF THE PREFERRED EMBODIMENTS

Figure 6:
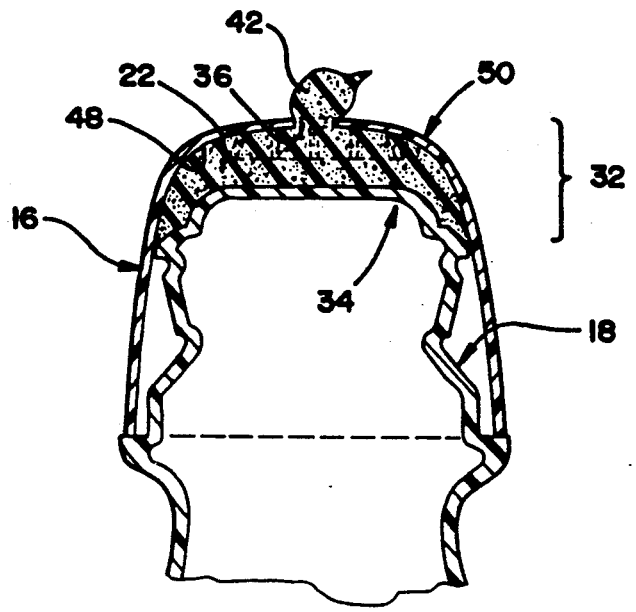
FIG. 6 is a vertical cross-sectional view of the cap detachably connected to the male mold member illustrating a curing step of the method during which a stream of foam is extruded through the aperture.

For purposes of description herein, the terms "upper," "lower," "right," "left," "rear," "front," "vertical," "horizontal" and derivatives thereof shall relate to the invention as oriented in FIGS. 1 and 8. However, it is to be understood that the invention may assume various alternative orientations and step sequences, except where expressly specified to the contrary. It is also to be understood that the specific devices and procedures illustrated in the attached drawings, and described in the following specification, are simply exemplary embodiments of the inventive concepts defined in the appended claims. Hence, specific dimensions, and other physical characteristics relating to the embodiments disclosed herein are not to be considered as limiting, unless the claims by their language expressly state otherwise.

PREFERRED EMBODIMENT OF FIGS. 1-7

The reference numeral 2 (FIGS. 1, 2 and 2A) refers to a unique seal for dispensing containers and the like formed in situ by a method embodying the present invention. The method is specifically for forming the seal 2 for a dispensing container 4 having a body 6 with a reservoir 8 retaining a product 10, a dispenser 12 with an applicator surface 14, and a cap 16 detachably connected with the body 6, and selectively covering the dispenser applicator surface 14.

Figure 7:
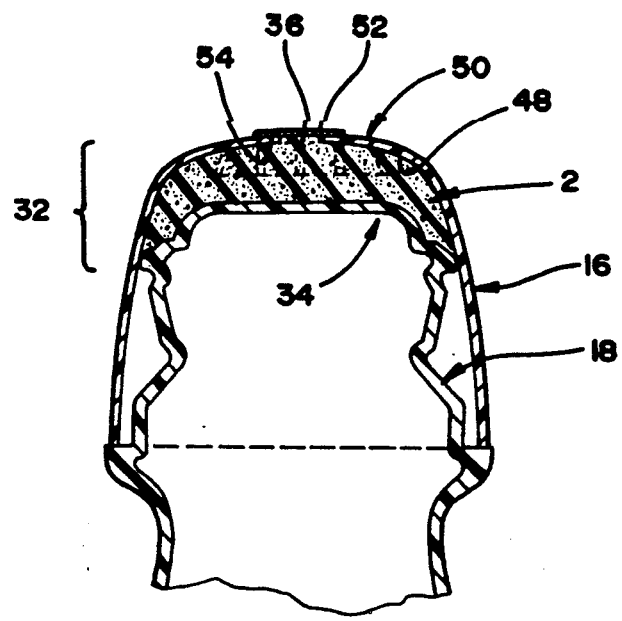
FIG. 7 is a vertical cross-sectional view of the cap detachably connected to the male mold member illustrating a finishing step of the method during which the extruded foam stream is severed and a patch applied.

In this example, the dispensing container 4 illustrated in FIGS. 1, 2 and 2A is constructed from thermoplastic materials. However, other materials can be used to construct body 6, dispenser 12 and cap 16, according to the product 10 being dispensed. The body 6 of dispensing container 4 is hollow (FIGS. 2 and 2A) to define a reservoir 8 which, as illustrated in FIG. 2A, contains a product 10. In the example illustrated in FIGS. 1-7, product 10 is a liquid deodorant or antiperspirant. Application of the product 10 is facilitated by use of applicator surface 14, which in the present example includes a closed cylinder 26 with semi-spherical ends, and is rotatably mounted in dispenser 12 by way of a mating socket 28. The exterior surface of rotatable cylinder 26 picks up product 10 from reservoir 8 for application of the same by a user.

In the preferred embodiment, the method for forming the seal 2 is most simply achieved by first providing the cap 16 and a mandrel 18 shaped geometrically similar to the dispenser 12. The cap 16 is then assembled to form a closed cavity 20 therebetween into which a foamable liquid 22 is injected. Foamable liquid 22 is preferably of the kind which expands when cured into a substantially closed cell construction.

The liquid foam 22 is finally cured in the closed cavity 20 to the extent that the liquid foam 22 expands to completely fill the closed cavity 20 and solidifies to create the seal 2 formed in situ on the cap 16. The cured foam seal 2 formed through the above method is adapted for positioning between the applicator surface 14 of the dispenser 12 and the cap 16 to prevent the product 10 from inadvertently leaking from the reservoir 8.

In the present example, the seal 2 is formed from a foamable liquid such as silicone, urethane, or styrene foams. However, any foam of the type which expands when cured into a substantially closed cell construction, without sticking to either mandrel 18 during molding or dispenser 12 pursuant to use thereon, would be suitable. In the present illustration the dispensing container 4 is used to apply a product 10, such as a deodorant, or the like. There is no reason, however, that the seal 2 could not be used on a variety of dispensing containers 4 used to retain all sorts of products 10, such as shoe polishes, perfumes, soaps, glues, baby powder, and a host of others.

Formation of the seal 2 preventing leakage of product 10 through cylinder 26 when dispensing container 10 is not being used is illustrated with the aid of FIGS. 3–7. Initially the cap 16 is detachably connected onto the mandrel 18 (FIG. 3) to form the closed cavity 20 between an upper portion 32 of cap 16 and an upper portion 34 of mandrel 18. While the mandrel 18 is used as a lower boundary of the cavity 20, it would be feasible, as discussed below, to use other male mold members to form the lower boundary.

In the embodiment illustrated in FIGS. 3–4 and 6–7, the mandrel 18 comprises a plastic material or any other inert material to which the expandable foam 22 will not stick. Additionally, the compression fit of the seal 2 can be adjusted by using mandrels 18 of varying sizes. In other words when the mandrel 18 is sized slightly smaller than the one of the cap 16 and the dispenser 12, the seal 2, which is resilient subsequent to curing, has a compression fit on the applicator surface 14 of the dispenser 12 to provide a secure seal.

As best illustrated in FIGS. 1 and 4, the cap 16 in which the seal 2 is formed includes a cap aperture 36 and reinforcing ribs 38, the significance of which is discussed below. As noted in the attached DISCLOSURE STATEMENT, reinforcing ribs have been used in conjunction with an adhesive to anchor a preformed gasket into a cap upper portion to provide a cap seal.

Once the cap 16 is secured over mandrel 18, a designated amount of foamable liquid 22 (FIG. 5) is injected through cap aperture 36. In FIG. 5, the foamable liquid 22 is introduced into the closed cavity 20 by use of nozzle 40. This introduction process could be performed with any device, such as a syringe, suitable for injecting designated quantities of foamable liquid 22 through cap apertures 36. Within a predetermined time of injecting foamable liquid 22 into closed cavity 20 and withdrawing nozzle 40 from cap aperture 36, the foamable liquid 22 has completely expanded throughout the closed cavity 22, and a stream of foamable liquid 42 is extruded through cap aperture 36. Extrusion of stream 42 through cap aperture 36 is particularly significant in that such extrusion provides a visual indication of when the foamable liquid 22 has completely expanded throughout closed cavity 20.

During the expansion process the foamable liquid 22, at least in the preferred embodiment, expands against the reinforcing ribs 38. As illustrated in FIG. 4, reinforcing ribs 38 comprise transverse ribs 43 and oval shaped rib 44. Transverse ribs 38 are arranged around oval shaped rib 44 to form negative draft spaces 46 into which portions of the foamable liquid 22 are injected during expansion. Upon curing of the foamable liquid 22, those portions of the liquid 22 that have been injected into the negative draft spaces 46 (FIG. 1) form a secure mechanical interconnection. Alternatively, the function of the reinforcing ribs 38 could be performed by providing a cap 16 without ribs 38, and coating an upper surface 48 of the cap 16 with a conventional adhesive. It is worth noting that use of the reinforcing ribs 38 or the adhesive is not essential to securing the seal 2 to upper cap portion 32 since even after curing, the foam seal 2 tends to press against upper cap portion 32 to form a mechanical connection, whether the ribs 38 or adhesive are present or not.

The curing step, in the present example, comprises air curing; nonetheless, air curing is not necessarily required if a foam expanding and curing under anaerobic conditions, such as silicone, is chosen. Upon partial curing of seal 2, the stream 42 of foamable liquid is severed flush with an exterior surface 50 of cap 16. Anytime thereafter a patch 52 with a bottom side 54 is secured over the cap aperture 36. In the present example, the bottom side 54 of patch 52 is coated with a conventional adhesive so that the patch 52 can be secured to exterior surface 50 by aligning the patch 52 over cap aperture 16, and pressing the patch 52 with a finger or the like.

After applying the patch 52, the cap 16 is withdrawn from the mandrel 18 for use with dispensing container body 6. As best demonstrated in FIGS. 2 and 2A, the seal 2 fits securely on dispenser 12 so that none of product 10 can leak from reservoir 8 across applicator surface 14. The cap 16, in the preferred embodiment, includes slots 57 and 58 (FIGS. 1 and 2A) for use with body protrusions 60 and 61. To secure cap 16 onto dispensing container body 6, cap 16 is pressed downward past dispenser 12 until slots 57 and 58 are snap-locked into place with respect to protrusions 60 and 61. Release and withdrawal of snap-locked cap 16 is effected by applying finger pressure (FIG. 2) near release surfaces 63 and 64. Use of in situ molding of the seal 2 directly onto applicator surface 14 instead of the mandrel 18 is comprehended in the method of forming the seal 2 in cap 16. More specifically, cap 16 could be secured on container 6 to form closed cavity 20 between applicator surface 14 and cap upper portion 32. As above, the designated amount of foamable liquid 22 would be injected via cap aperture 36 and the foamable liquid 22 would be allowed to expand until the stream 42 is extruded through cap aperture 36. After securing stream 42 and applying patch 52, the method would be fully completed. In situ molding of seal 2 between the applicator surface 14 and the cap upper portion 32 eliminates the need to insert and remove the mandrel 18. By molding the seal 2 on the applicator surface 14, the cost and effort required to effect the method is decreased since three steps are eliminated. That is, the mandrel 18 does not have to be either inserted or removed from the cap 16 for purposes of molding the seal 2, and the cap 16 is secured on the container 6 prior to the molding process.

PREFERRED EMBODIMENT OF FIGS. 8–14

Another embodiment of the present method is illustrated in FIGS. 8–14. Use of this other method allows for the formation of seal 2 (FIGS. 8 and 9) on a fixed dispenser 66 of a dispensing container 68. Dispensing container 68 is of the type having a body 70 with a reservoir 72 retaining a product, the dispenser 66 with a dispenser upper wall 76, and a cap 78 detachably connected with the body 70, and selectively covering the dispenser upper wall 76. Consideration of materials used to construct the dispensing container 68 is much the same as that given to constructing dispensing container 4, as discussed above.

To mold the seal 2 in situ on dispenser 66 a coat 82 of a conventional adhesive is applied to an exterior surface 80 of the dispensing upper wall 76 (FIG. 10). Before the adhesive coat 82 has dried, mandrel 84, geometrically shaped similar to cap 78, is assembled with dispenser 66 (FIG. 11) to form a substantially closed cavity 87 therebetween. Mandrel 84 includes a mandrel aperture 86 through which foamable liquid 22 can be injected via nozzle 40. It is not necessary that a mandrel 84 be used to facilitate the in situ molding process—a female mold member such as the cap 78 could be used to form the closed cavity 87. Within a few minutes the foamable liquid 22 expands and stream 88 of foamable liquid 22 (FIG. 12) extrudes out of cap aperture 78 to provide a visual indication that closed cavity 86 is full.

After the foamable liquid has cured (FIG. 13) the mandrel 84 is withdrawn, and a dispensing container aperture 90 communicating with dispensing container reservoir is formed through seal 2, adhesive coat 82 and dispenser upper wall 76. The dispensing aperture 90 may be formed with any suitable aperture forming device, such as a drill. To facilitate application of product 74 using the foam covered dispenser 92, a skin 94 may be applied to an exterior surface 96 of seal 2.

In the present example, dispensing aperture 90 is covered by a flexible patch 98 (FIG. 14) having a conventional adhesive applied to an underside portion of patch 98, so that patch 98 can be secured to skin 94 by pressing patch 98 over dispensing aperture 90 using a finger or the like. As best demonstrated in FIGS. 8 and 9, the foam covered dispenser 92 is covered by cap 78 when the dispensing container 68 is not in use. Rim 100, disposed around an edge of the cap 78 is biased against dispenser upper wall 76, as demonstrated in FIG. 9, to secure the cap 78 to the dispensing container body 70. The cap 78 can be withdrawn, when desired, by simply pulling upward on the rim 100.

Use of the above-described method makes the forming of seals for dispensing containers, and assembly thereon, particularly easy. Since the seal is formed in situ, the need to manually install the seal or the possibility of forming an inadequately sized seal is virtually eliminated. As to forming a seal 2 for cap 16, a secure fit between the seal 2 and the dispenser 12 insures that leakage is eliminated between dispensing container reservoir 8 and the applicator surface 12. By using only a preselected amount of foamable liquid 22, and being able to ascertain when the closed cavity 20 is filled through watching for extrusion of foam stream 42, production costs are minimized. Provision of reinforcing ribs 38 allow for an optimum mechanical interconnection between upper cap portion 32 and the seal 2. It is possible to adjust the compression fit of the cap 16 by simply altering the sizes of the mandrel 18 employed. As to forming a seal 2 for dispenser 66, a soft dispenser including a skin 94 is provided for a variety of uses while costs are minimized because of the simplicity and efficiency of the process employed.

In the foregoing description, it will be readily appreciated by those skilled in the art that modifications may be made to the invention without departing from the concepts disclosed herein. Such modifications are to be considered as included in the following claims unless the claims by their language expressly state otherwise.

I claim:

1. A method for forming a seal for dispensing containers and the like of the type having a body with a reservoir adapted to retain therein a product to be dispensed, a dispenser with an applicator surface adapted to dispense the product from the reservoir, and a cap detachably connected with the body, and selectively covering the applicator surface of the dispenser, said method comprising:
providing the cap;
providing a mandrel shaped geometrically similar to the dispenser;
assembling the cap on the mandrel, thereby forming a substantially closed cavity therebetween;
providing liquid foam of the type which expands when cured into a substantially closed cell construction;
after said assembling step, injecting the liquid foam into the cavity;
after said injecting step, curing the liquid foam in the cavity to the extent that the liquid foam expands to completely fill the cavity, and solidifies to create a foam seal formed in situ on the cap, which is adapted for positioning between the applicator surface of the dispenser and the cap to prevent the product from inadvertently leaking from the reservoir.

2. A method as set forth in claim 1, including:
disassembling the cap from the mandrel; and
assembling the cap with the dispenser.

3. A method as set forth in claim 2, wherein:
the mandrel is sized slightly smaller than the dispenser; and
the liquid foam is resilient when cured, such that the foam seal has a compression fit on the applicator surface of the dispenser to provide a secure seal.

4. A method as set forth in claim 3, wherein said foam curing step comprises air curing.

5. A method as set forth in claim 4, wherein said foam injecting step comprises:
forming an aperture through the cap;
inserting a foam injection nozzle through the cap aperture and into the cavity during the injection of the liquid foam therein; and
withdrawing the injection nozzle from the cap aperture after a preselected amount of the liquid foam has been injected into the cavity.

6. A method as set forth in claim 5, wherein said foam injecting step further comprises:
selecting the preselected amount of liquid foam such that as the liquid foam cures, it expands to completely fill the cavity and then extrudes a stream of foam out through the cap aperture to provide a visual indication that the cavity is full.

7. A method as set forth in claim 6, including:
severing the extruded stream of foam flush with an exterior surface of the cap after the foam is at least partially cured.

8. A method as set forth in claim 7, including:
applying a patch on the exterior surface of the cap, over the cap aperture after said stream severing step.

9. A method as set forth in claim 8, including:
providing the cap with reinforcing ribs which form negative draft spaces in the cap into which the liquid foam is injected to securely mechanically interconnect the foam seal and the cap.

10. A method as set forth in claim 9, including:
providing a manually releasable snap-lock between the cap and the body to facilitate removal of the cap.

11. A method as set forth in claim 10, wherein:
said liquid foam providing step comprises selecting a silicone foam which is inert with respect to the product.

12. A method as set forth in claim 10, wherein:
said liquid foam providing step comprises selecting a urethane foam which is inert with respect to the product.

13. A method as set forth in claim 10, wherein:
said liquid foam providing step comprises selecting a styrene foam which is inert with respect to the product.

14. A method as set forth in claim 1, wherein:
the mandrel is sized slightly smaller than the dispenser; and
the liquid foam is resilient when cured, such that the foam seal has a compression fit on the applicator surface of the dispenser to provide a secure seal.

15. A method as set forth in claim 1, wherein said foam curing step comprises air curing.

16. A method as set forth in claim 1, wherein:
said foam injecting step comprises:
forming an aperture through the cap;
inserting a foam injection nozzle through the cap aperture and into the cavity during the injection of the liquid foam therein; and
withdrawing the injection nozzle from the cap aperture after a preselected amount of the liquid foam has been injected into the cavity.

17. A method as set forth in claim 16, wherein said foam injecting step further comprises:
selecting the preselected amount of liquid foam such that as the liquid foam cures, it expands to completely fill the cavity and then extrudes a stream of foam out through the cap aperture to provide a visual indication that the cavity is full.

18. A method as set forth in claim 1, wherein:
the one of the cap and the dispenser comprises the cap; and including providing a manually releasable snap-lock between the cap and the body to facilitate removal of the cap.

19. A method as set forth in claim 1, wherein:
said liquid foam providing step comprises selecting a silicon urethane foam which is inert with respect to the product.

20. A method as set forth in claim 1, wherein:
said mandrel providing step comprises providing the dispenser, such that the foam seal is formed in situ in a finished article.

21. A method as set forth in claim 1, wherein:
the dispenser includes an upper wall with an aperture therethrough communicating with the reservoir;
the cavity is formed between the mandrel and an exterior surface of the dispenser upper wall; and including
preparing the exterior surface of the dispenser upper wall such that the foam seal adheres thereto.

22. A method as set forth in claim 21, including:
forming an aperture through the foam seal which communicates with the aperture in the dispenser upper wall, such that the foam seal has an outer surface which defines the applicator surface.

23. A method as set forth in claim 22, including:
forming a skin on the outer surface of the foam seal to facilitate application of the product.

* * * * *

UNITED STATES PATENT AND TRADEMARK OFFICE
CERTIFICATE OF CORRECTION

PATENT NO. : 5,193,264
DATED : March 16, 1993
INVENTOR(S) : Paul E. Brown

It is certified that error appears in the above-identified patent and that said Letters Patent is hereby corrected as shown below:

On the Title Page, Item [73]:

Assignee "Steelcase Inc., Grand Rapids, Mich."

should be --Liquid Molding Systems, Inc., Midland

Mich.--

Signed and Sealed this

Twenty-first Day of June, 1994

Attest:

BRUCE LEHMAN

Attesting Officer      Commissioner of Patents and Trademarks